United States Patent
Kunitomo et al.

(10) Patent No.: US 9,756,838 B2
(45) Date of Patent: Sep. 12, 2017

(54) CIRCULATION TYPE AQUACULTURE METHOD AND CIRCULATION TYPE AQUACULTURE DEVICE

(71) Applicant: KITZ CORPORATION, Chiba (JP)

(72) Inventors: Shinta Kunitomo, Chiba (JP); Takako Sakurai, Nagano (JP); Toshihiro Katakura, Nagano (JP); Masatoshi Fuji, Nagano (JP)

(73) Assignee: KITZ CORPORATION, Chiba (JP)

( * ) Notice: Subject to any disclaimer, the term of this patent is extended or adjusted under 35 U.S.C. 154(b) by 0 days.

(21) Appl. No.: 15/027,105

(22) PCT Filed: Mar. 26, 2015

(86) PCT No.: PCT/JP2015/059291
§ 371 (c)(1),
(2) Date: Apr. 4, 2016

(87) PCT Pub. No.: WO2015/151984
PCT Pub. Date: Oct. 8, 2015

(65) Prior Publication Data
US 2016/0227749 A1    Aug. 11, 2016

(30) Foreign Application Priority Data

Mar. 31, 2014  (JP) ................................. 2014-071956

(51) Int. Cl.
*A01K 63/04*    (2006.01)
*C02F 1/78*    (2006.01)
(Continued)

(52) U.S. Cl.
CPC ............ *A01K 63/04* (2013.01); *A01K 63/042* (2013.01); *C02F 1/76* (2013.01); *C02F 1/78* (2013.01);
(Continued)

(58) Field of Classification Search
CPC ..... A01K 63/045; A01K 63/04; A01K 63/042; C02F 2103/20; C02F 3/085; C02F 3/302
(Continued)

(56) References Cited

U.S. PATENT DOCUMENTS 5,879,567 A * 3/1999 Robertson ............ A01K 63/045
119/260
6,143,187 A * 11/2000 Robertson ............ A01K 63/045
119/259

(Continued)

FOREIGN PATENT DOCUMENTS

JP    5-64533    3/1993
JP    5-76257    3/1993
(Continued)

OTHER PUBLICATIONS

International Search Report issued Jun. 23, 2015 in International Application No. PCT/JP2015/059291.

*Primary Examiner* — Yvonne Abbott-Lewis
(74) *Attorney, Agent, or Firm* — Wenderoth, Lind & Ponack, L.L.P.

(57) ABSTRACT

A circulation type aquaculture method and a circulation type aquaculture apparatus which treat and remove ammonia harmful to fishes/shellfishes. The method includes a first step of finding an ammonia decomposition rate upon preliminarily treating cultivation water by using ozone or hypochloric acid so as to set a target remaining amount of ammonia after the decomposing treatment, a second step of finding the amount of ammonia in cultivation water so as to calculate a treating period of time required for reducing the amount of ammonia to the target remaining amount of ammonia based upon the ammonia decomposition rate of the first step, a third step of treating the cultivation water using ozone or hypochloric acid during the treating period of time calculated in the second step so as to treat and decompose (Continued)

ammonia in the cultivation water and a fourth step of returning the cultivation water to the aquaculture tank.

9 Claims, 4 Drawing Sheets

(51) Int. Cl.
    *C02F 1/76*          (2006.01)
    *C02F 1/28*          (2006.01)
    *C02F 1/32*          (2006.01)
    *C02F 101/16*       (2006.01)
    *C02F 103/20*       (2006.01)

(52) U.S. Cl.
    CPC ............... *C02F 1/283* (2013.01); *C02F 1/32* (2013.01); *C02F 2101/16* (2013.01); *C02F 2103/20* (2013.01); *C02F 2209/04* (2013.01); *C02F 2301/046* (2013.01)

(58) Field of Classification Search
    USPC .......... 119/259, 260, 268; 210/416.2, 167.22
    See application file for complete search history.

(56) References Cited

U.S. PATENT DOCUMENTS

| | | | |
|---|---|---|---|
| 6,168,711 B1 * | 1/2001 | Teramachi | B01D 53/84 210/123 |
| 6,722,314 B1 * | 4/2004 | Crisinel | A01K 63/042 119/200 |
| 7,082,893 B2 * | 8/2006 | Schreier | A01K 63/045 119/259 |
| 7,462,284 B2 * | 12/2008 | Schreier | A01K 63/04 119/227 |
| 7,527,730 B2 * | 5/2009 | Johannsson | A01K 63/045 119/259 |
| 7,604,734 B2 * | 10/2009 | Smith | A01K 63/04 119/260 |
| 2016/0227749 A1 * | 8/2016 | Kunitomo | A01K 63/042 |

FOREIGN PATENT DOCUMENTS

| | | |
|---|---|---|
| JP | 8-308430 | 11/1996 |
| JP | 2004-344144 | 12/2004 |
| JP | 5028566 | 9/2012 |

* cited by examiner

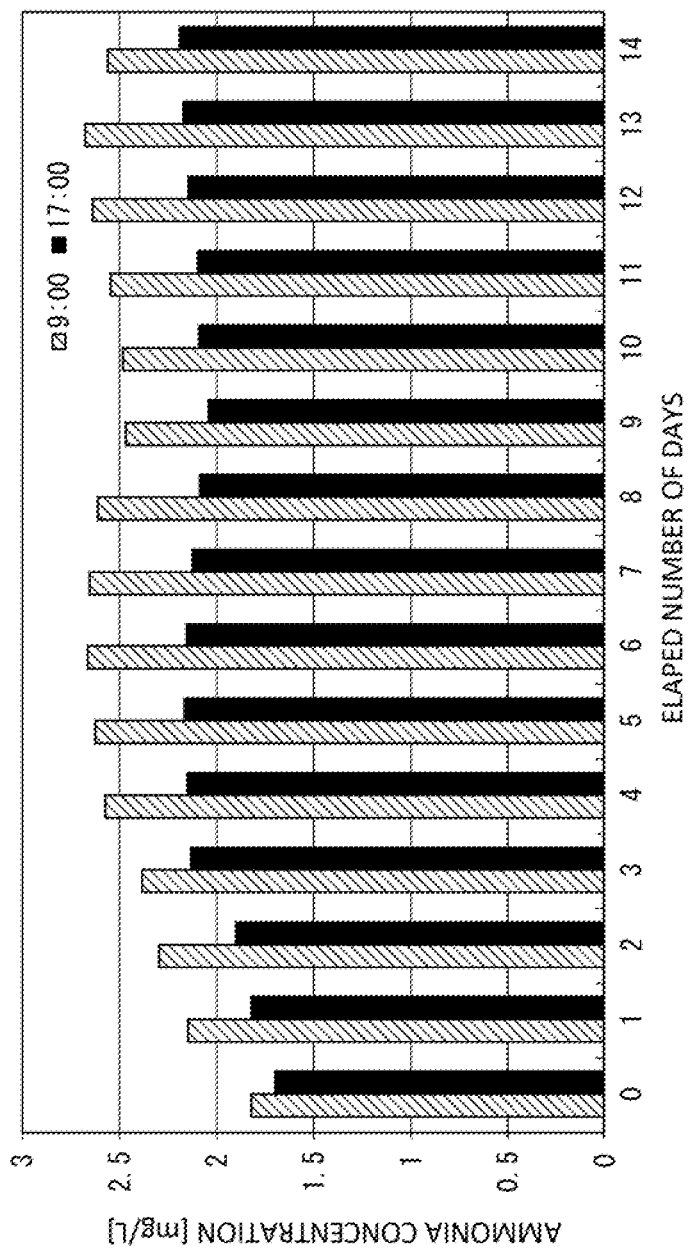

CIRCULATION TYPE AQUACULTURE METHOD AND CIRCULATION TYPE AQUACULTURE DEVICE

TECHNICAL FIELD OF THE INVENTION

The present invention relates to a circulation type aquaculture method and a circulation type aquaculture apparatus, which are, in particular, suitably used for a closed-type aquaculture system for fishes/shellfishes, and decompose ammonia contained in the cultivation water for culturing and cultivating fishes/shellfishes, so as to remove the ammonia therefrom.

BACKGROUND OF THE INVENTION

In the cultivation water of culturing farms, cultivating farms and aquariums, ammonia contained in excrements from fishes/shellfishes, residues of feeds, or the like are decomposed in water by microorganisms, with the result that ammonia is left in the water, and the ammonia is accumulated at the lapse of time. Since ammonia is high in biological toxicity and harmful to fishes/shellfishes, as countermeasures against this problem, it has been known that, for example, ammonia is removed by using a removing method by biodegradation utilizing microorganisms. In the aquaculture method for removing ammonia by using such a biological treatment, however, problems are raised in that a large area is required as a treatment tank, or large power is required for an aeration pump to cause high costs, or the ammonia decomposition treating performance becomes unstable due to influences of temperatures and amounts of loads.

For these reasons, in recent years, a decomposing treatment has been proposed in which ammonia is removed by using a physical treatment in which ozone or electrolyzed hypochloric acid is used. In this decomposing treatment, since oxidizing substances harmful to fishes/shellfishes, referred to as oxidants, are easily accumulated as the treatment proceeds, various methods for removing ammonia, while suppressing the generation of oxidants, or eliminating oxidants, have been disclosed.

As the removing method of ammonia by using the physical treatment of this type, for example, Patent Document 1 has disclosed an ammonia decomposing method by using ozone. This Patent Document has described a structure in which an oxidation-reduction potential measuring electrode for measuring an oxidation-reduction potential of seawater that has been subjected to an ozone treatment is installed near an outlet of an ozone contact tower so that the ozone generation amount is controlled so as to set its oxidation-reduction potential within a range of 450 to 650 mV (see Paragraph [0005]). This ammonia decomposing method is designed so as to decompose ammonia by utilizing the fact that as the decomposition of ammonia proceeds by ozone injection and at the time when the ammonia becomes substantially zero, oxidants are generated together with an abrupt increase of the oxidation-reduction potential.

On the other hand, Patent Document 2 has disclosed a fishes/shellfishes rearing water purifying device in which by utilizing hypochloric acid generated in cultivation water by the use of electrolysis, ammonia is decomposed. In this Patent Document 2, it is disclosed that by detecting a hypochloric acid concentration during the rearing process, a controlling process is carried out so as to reduce the residual chlorine concentration of cultivation water (see Paragraph [0009]). It has been known that the hypochloric acid to be utilized in this water purifying device is one kind of oxidants, which is a very toxic substance to fishes/shellfishes.

Patent Document 3 has disclosed an ammonia decomposing device in which electrolyzed hypochloric acid is used. This Patent Document 3 describes a process in which ammonia and hypochloric acid discharged by fishes/shellfishes are adsorbed onto the surface of an adsorbing material so as to remove ammonia (see Paragraph [0015]).

PRIOR ART DOCUMENTS

Patent Documents

Patent Document 1: JP-A No. 5-64533
Patent Document 2: JP-A No. 2004-344144
Patent Document 3: Japanese Patent No. 5028566

SUMMARY OF THE INVENTION

Problems to be Solved by the Invention

However, in the above-mentioned Patent Document 1, problems arise in that upon measuring an oxidation-reduction potential, a controlling process by using a fixed value becomes difficult because the oxidation-reduction potential is influenced by the pH of water to be treated, in that immediately before ammonia is decomposed to be zero, oxidants are generated, in that a time difference is caused between the point of time when oxidants are generated and the increase of an oxidation-reduction potential, in that the responsiveness of the oxidation-reduction potential measuring device is poor with the result that a period of time of about 5 to 10 minutes is required before the measured value has reached a fixed value, in that measured values differ depending on the respective electrodes to cause a tolerance of about ±25 mV, and in that a serious error occurs when the tip of the electrode is formed into a coat film due to a biofilm; therefore, because of these problems, it becomes difficult to carry out the corresponding process while immediately responding to the generation of oxidants.

In the case of Patent Document 2, since a measuring device capable of directly measuring concentrations of hypochloric acid and residual chlorine in seawater promptly is not generally utilized, these measurements have to be conducted by using a conversion such as a calorimetric method or the like, with the result that it becomes difficult to carry out continuous measurements.

Because of these problems, the method for detecting the generation of oxidants itself requires a long period of time in measurements, and might have a failure in suppressing the generation of oxidants. In this case, even when the generated oxidants have a trace amount, it becomes difficult to avoid toxicity against fishes/shellfishes, consequently to cause a high risk of killing fishes/shellfishes.

Moreover, in an attempt to measure oxidants by using these devices, in the same manner as in the case when upon decomposing ammonia, adverse influences are given by water quality such as the temperature and the pH, the output of an ozonizer-electrolyzed hypochloric acid generation device and device conditions (mixing method, volumes or the like) of treatment tanks or the like, serious adverse effects are given by these device conditions, with the result that it becomes difficult to adapt the same measuring method to various kinds of devices.

Moreover, upon decomposing ammonia by using a physical treatment by the use of ozone, harmful bromic acid might be generated during the decomposing treatment, and the resulting bromic acid might cause adverse effects to fishes/shellfishes.

On the other hand, in the case when an attempt is made to adsorb oxidants by using an adsorbing agent such as activated carbon, zeolite or the like, as shown in Patent Document 3, many problems are raised in that the adsorbing capability of the adsorbing agent is lowered at the lapse of time, that is, the treating capability is lowered due to clogging of the adsorbing agent, in that biofilms are generated inside the adsorbing agent to cause germs in the cultivation water, and in that high costs are required for the use of the adsorbing agent.

In addition to these, fishes/shellfishes in the aquaculture tank tend to have their discharging amount of ammonia abruptly raised because their metabolism is raised after the feeding time, while when their metabolism is lowered at night, they tend to have their discharging amount of ammonia lowered. In this manner, the amount of ammonia generated from fishes/shellfishes is not always constant, and ammonia is continuously generated and accumulated, while its increasing amount per unit time is being fluctuated in a day.

In the case when an ammonia treatment is carried out on this ammonia discharging amount by using a conventional physical treatment, the treating rate is made constant in most cases. In this case, when the ammonia treating amount per unit time is set based upon the maximum value after the feeding time as a reference, oxidants tend to be easily generated because an excessive treatment is carried out in other cases, such as at night or the like, while in the case when it is set based upon the minimum value at night, upon generation of an excessive amount of ammonia, the ammonia is no longer processed with the result that ammonia might be accumulated in the water tank. On the other hand, even when the treating condition is set based upon an average discharging amount, there is always the probability of an excessively large or small treatment.

As described above, there is a correlation between the removing treatment of ammonia and the generation of oxidants, and there have been strong demands for developing an aquaculture method and an aquaculture apparatus capable of treating water, while preventing adverse influences to fishes/shellfishes due to these two factors.

The present invention has been devised so as to solve the above-mentioned problems, and its object is to provide a circulation-type aquaculture method and a circulation-type aquaculture apparatus which can carry out a removing treatment of ammonia harmful to fishes/shellfishes while preventing the generation of toxic oxidants due to an excessive treatment, and also carry out the ammonia removing treatment in accordance with the increase/decrease of the discharge amount of ammonia from fishes/shellfishes so as to prevent the accumulation of ammonia into the cultivation water.

Means to Solve the Problems

In order to achieve the above-mentioned object, the invention in accordance with claim 1 relates to a method for treating cultivation water in a circulation type aquaculture tank in which aquatic organisms are kept by using an aquaculture apparatus main body, and the method is provided with a first step of finding an ammonia decomposition rate upon preliminarily treating the cultivation water by using ozone or hypochloric acid, while setting a target remaining amount of ammonia after the decomposing treatment, a second step of finding the amount of ammonia in cultivation water to be treated so as to calculate a treating period of time required for reducing from this ammonia amount to the target remaining amount of ammonia of the first step based upon the ammonia decomposition rate of the first step, a third step of treating the cultivation water by using ozone or hypochloric acid during the treating period of time calculated in the second step so as to decompose ammonia in the cultivation water, and a fourth step of returning the cultivation water that has been subjected to the decomposing treatment in the third step to the aquaculture tank.

In this case, the second step to the fourth step may be continuously or intermittently repeated, or in the apparatus to carry out the steps, the first step may not be carried out, and another apparatus having the same structure may be used to carry out the first step, and the result thus obtained may be diverted to be used therein. Moreover, the first step is not carried out only one time in one apparatus, and, for example, the first step may be carried out one time for every plurality of times of the second to fourth steps; thus, ammonia in the cultivation water may be decomposed and treated by repeating at least one set of steps from the second step to fourth step, or a plurality of sets of these steps.

Moreover, with respect to the ammonia decomposition rate which differs depending on various external conditions, such as the pH, temperature or the like, in the first step, the ammonia decomposition rate may be found based upon only one condition, or may be found based upon a plurality of conditions. In the case when the ammonia decomposition rate is found based upon only the one of external conditions, upon carrying out the third step, adjustments may be made based upon a condition close to the corresponding condition; on the other hand, in the case when the ammonia decomposition rate is found based upon a plurality of conditions, conditions in the third step can be adjusted on demand, and the ammonia decomposition rate found under a condition close to the condition at that point of time may be adopted.

In accordance with the above-mentioned method, in the first step, in addition to the ammonia treating capability by the treating section, the target ammonia remaining amount required for preventing the generation of bromic acid is confirmed depending on the apparatus to be used, and in accordance with these, the treating period of time required for achieving the target ammonia remaining amount in the second step is calculated, and in the third step, by carrying out the treatment during the treating period of time calculated in the second step, it is possible to carryout the ammonia decomposing treatment, while positively preventing the generation of bromic acid. In this manner, in the apparatus actually used or the apparatus having the same structure, when apparatus requirements of treating sections, such as the capability of an ozonizer or a hypochloric acid supplying device, the mixing method of ozone or hypochloric acid, the volumes of treating units, are kept constant, it becomes possible to carry out a stable ammonia treatment by the treatments of the respective steps, without the ammonia decomposing capability being influenced by ozone or hypochloric acid.

Moreover, in the case when the first step has been carried out once, since the treatments to be carried out thereafter may be executed based upon treating conditions directed by calculations, it is not necessary to monitor indexes, such as ORP and the ammonia remaining amount or the like, in real time so as to find out the completion of the treatments, thereby making it possible to easily control the ammonia decomposition so as to prevent the generation of bromic acid.

The invention in accordance with claim 2 relates to a circulation type aquaculture method in which an ammonia decomposition rate is found relative to the apparatus main body having a predetermined structure, and based upon this ammonia decomposition rate, the ammonia decomposing treatment is carried out by the apparatus main body in the second step and thereafter.

In accordance with this method, the ammonia decomposition rate is set in accordance with each of aquaculture apparatus main bodies, and by using an optimal ammonia decomposition rate by the corresponding aquaculture apparatus, the ammonia decomposing treatment can be carried out effectively. Moreover, when the aquaculture apparatus main body is designed to have a predetermined identical structure, ammonia can be decomposed and treated by the same ammonia decomposition rate at the same efficiency even in another aquaculture apparatus main body.

The invention in accordance with claim 3 relates to a circulation type aquaculture method in which at the time of a decomposing treatment from the second step to the fourth step after the second time or later, a value obtained by feeding back the results up to the previous step is used as the ammonia decomposition rate.

By providing this method, in the case when the set of steps from the second step to the fourth step are repeatedly carried out a plurality of times, by applying the ammonia decomposition rate obtained based upon the results obtained in the step immediately before, the ammonia decomposition rate to which a latest state of the apparatus is reflected can be applied so that it becomes possible more positively control the ammonia decomposition reaction.

The invention in accordance with claim 4 relates to a circulation type aquaculture method in which by measuring the ORP of cultivation water after the decomposing treatments from the second step to the third step, the decomposing treatment is stopped when the measured value has reached a preliminarily set value.

With this arrangement, it becomes possible to confirm the generation of toxic bromic acid from the ORP value of the cultivation water after the treatments. For this reason, by monitoring the value of the ORP of the cultivation water after the treatments, the decomposing treatment can be stopped when a set value in a level having no fear of generating bromic acid has been reached so that even when, if any abnormality should occur, the decomposition of ammonia would no longer proceed as expected by the calculation results, the generation of bromic acid can be positively prevented.

The invention in accordance with claim 5 relates to a circulation type aquaculture apparatus which includes a circulation type aquaculture tank in which aquatic organisms are reared and a treating section which treats cultivation water drawn from the aquaculture tank by using ozone or hydrochloric acid, and then returns the resulting cultivation water to the aquaculture tank, and the treating section includes a control means that sets a decomposition rate of ammonia and a target remaining amount of ammonia after the decomposing treatment, and calculates a treating period of time required for reducing the ammonia amount in the cultivation water to be treated to the target remaining amount of ammonia, and a decomposition treatment means for treating the cultivation water by using ozone or hypochloric acid so as to decompose ammonia in the cultivation water.

With this arrangement, by properly carrying out the ammonia treatment in the cultivation water through the treating section, it becomes possible to decompose ammonia, while positively preventing the generation of bromic acid. In the apparatus or apparatuses having the same structure to be actually used, in the case when apparatus requirements of treating sections, such as the capability of an ozonizer or a hypochloric acid supplying device, the mixing method of ozone or hypochloric acid and the volumes of the treating units, are kept constant, it becomes possible to carry out a stable ammonia treatment process, without the ammonia decomposing capability by ozone or hypochloric acid being adversely influenced.

Moreover, it is not necessary to monitor indexes, such as ORP and the ammonia remaining amount or the like, in real time so as to find out the completion of the treatments, thereby making it possible to easily control the ammonia decomposition so as to prevent the generation of bromic acid.

The invention in accordance with claim 6 relates to a circulation type aquaculture apparatus in which an ORP measuring device for measuring the ORP of cultivation water that has been treated by the decomposition treatment means.

In this case, since the possibility of the generation of bromic acid can be confirmed by the ORP value of the cultivation water that has been treated, it becomes possible to positively prevent the generation of bromic acid or the like, by monitoring the ORP value of the cultivation water that has been treated and by stopping the decomposing treatment when the value has reached a set value in a level having no fear of generating bromic acid.

Effects of Invention

In accordance with the present invention, it becomes possible to positively treat and remove ammonia that is harmful to fishes/shellfishes, while preventing the generation of toxic oxidants and bromic acid by preventing an excessive ammonia treatment, and also to positively prevent ammonia from being accumulated in cultivation water by carrying out an appropriate ammonia removing treatment in accordance with the discharge amount of ammonia from fishes/shellfishes that increases and decreases depending on states, such as after feeding time, at night or the like, and changes in time.

BRIEF DESCRIPTIONS OF THE DRAWINGS

FIG. 4 is a graph indicating variations in concentration of ammonia.

DESCRIPTIONS OF THE PREFERRED EMBODIMENTS

Referring to FIGS., the following description will discuss embodiments of a circulation type aquaculture method and a circulation type aquaculture apparatus in accordance with the present invention.

Figure 1:
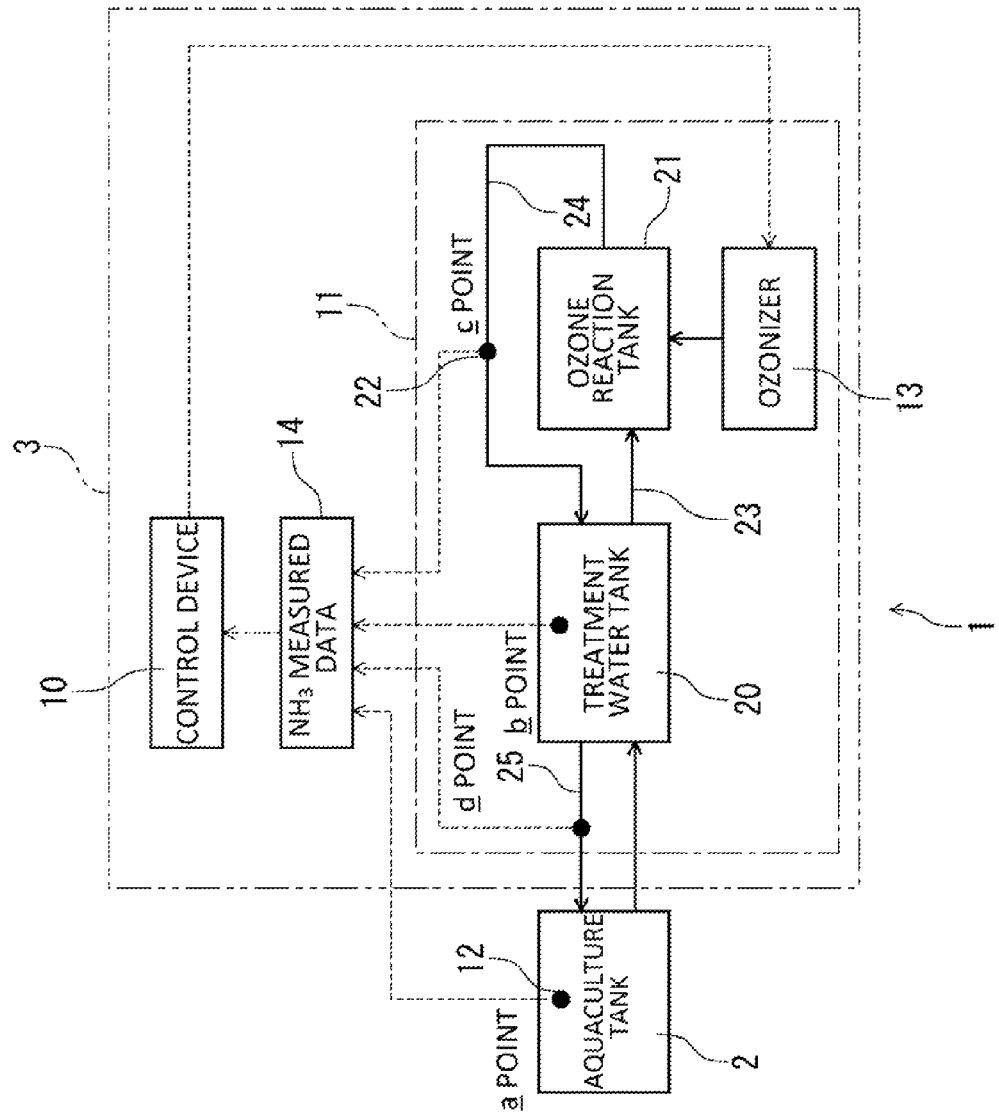
FIG. 1 is a schematic view showing a first embodiment of a circulation type aquaculture apparatus.

First, referring to the schematic view shown in FIG. 1, the circulation type aquaculture apparatus will be explained. FIG. 1 shows a first embodiment of the circulation type aquaculture apparatus. This circulation type aquaculture apparatus main body (hereinafter, referred to as "apparatus main body 1") is provided with a circulation type aquaculture tank 2 for use in keeping aquatic organisms and a treatment section 3 that draws one portion of cultivation water from the aquaculture tank 2, and after the cultivation water thus drawn has been processed by using ozone or hypochloric acid, returns the resulting cultivation water to the aquaculture tank 2.

In FIG. 1, the treatment section 3 indicated by a two-dot chain line is provided with a control means 10 constituted by a control device, a decomposition treatment means 11, an ammonia sensor 12 for measuring the ammonia concentration in water and a pump, not shown, for use in moving water.

Among these, the control device 10, which is constituted by, for example, a personal computer, a sequencer or the like, is designed so as to output control signals relating to an ON/OFF control and an ozone injection amount or the like of an ozonizer 13 installed in the decomposition treatment means 11. The control device 10 is provided with a data storing section 14, and various measuring data relating to the aquaculture tank 2 and the decomposition treatment means are stored in the data storing section 14. The control device 10 can set the ammonia decomposition rate and a target ammonia remaining amount after the decomposition treatment, in accordance with measured data in the data storing section 14, and is designed to calculate a treatment period of time required for reducing the ammonia amount in cultivation water to be treated to the target ammonia remaining amount so that it can control operations of the ozonizer 13 by the input of the measured ammonia concentration.

Moreover, the control device 10 is designed to be able to adjust not only the output of the control signals to the ozonizer 13, but also the amount of ozone by controlling the material gas pressure, gas flow rate, discharge voltage-electric current or the like. In addition to these, it also has setting and adjusting functions for driving controls for the entire apparatus including the water temperature required for cultivation, dissolved oxygen amount, pH, electric conductivity, salt concentration, oxidation-reduction electric potential, hydrocarbon gas concentration, alkali degree, heating and cooling temperatures, detection of water level, operations of pumps, valves (not shown) or the like, water feeding amount, etc., as well as recording and outputting of driving states and driving logs, issuing emergency warning, external data communication function or the like; thus, the apparatus main body 1 is installed so as to be automatically driven in a stable manner.

As indicated by an alternate long and short dash line of FIG. 1, the decomposition treatment means 11 is provided with a treatment water tank 20, an ozone reaction tank 21 and the ozonizer 13, and is designed to carryout an ozone treatment on the cultivation water so as to be subjected to the ammonia decomposition treatment.

The treatment water tank 20 of the decomposition treatment means 11 is designed to draw one portion of the cultivation water of the aquaculture tank 2 and temporarily store the cultivation water to be ozone-treated.

The ozone reaction tank 21 is installed to carry out the ozone treatment on the cultivation water, and the ozone reaction tank 21 and the treatment water tank 20 are connected to each other by a predetermined flow passage 23. The ozone reaction tank 21 may be prepared as a normal air-diffusion-type tank or a tank using an injector, and either type one may be used as long as it can dissolve ozone in water.

Additionally, as a treatment to be carried out on the cultivation water by the decomposition treatment means 11, a hypochloric acid treatment may be carried out in place of the ozone treatment. This is because a decomposing reaction of ammonia is also exerted by the hypochloric acid (in particular, electrolyzed hypochloric acid) in the same manner as in the case of ozone. Upon carrying out the hypochloric acid treatment, the ozone reaction tank may be used as the hypochloric acid reaction tank, and this tank may be used for generating hypochloric acid by using electrolysis, or hypochloric acid may be externally added thereto.

The ozonizer 13 is designed such that, upon receipt of a control signal from the control means 10, it can send an ozone gas into the ozone reaction tank 21, with the ozone concentration, ozone gas flow rate and the like being changed. In this case, a material gas for use in generating ozone may be air; however, since in the case when ozone is generated by using discharge, nitrogen in the air undesirably changes into nitric acid that is highly toxic to fishes/shellfishes, and this point requires great caution. For this reason, as the material gas, a gas obtained by vaporizing liquid oxygen, or a gas supplied from a pure oxygen cylinder or an oxygen supplying apparatus (PSA) is desirably used.

As the ammonia sensor 12 in the treatment section 3, an electrode-type sensor that can directly measure the ammonia concentration in water, or any sensor may be used, as long as it can carry out the measurement continuously while allowing water to pass therethrough. On the other hand, the worker may measure the absorbance by using a batch-type reagent so as to obtain the ammonia concentration, and it is not necessarily required to use the ammonia sensor as long as the ammonia concentration at that point of time can be confirmed. After the measurement of the ammonia concentration, the value of the measured ammonia concentration may be electrically inputted to the control device, or in the case of the batch-type measurement, the worker may directly input the value to the control device manually. In this case, in FIG. 1, measurement points of ammonia are set to a point: inside the aquaculture tank 2, b point: inside the treatment water tank 20, c point: inside an ozone treatment water passage 24 for use in returning water from the ozone reaction tank 21 to the treatment water tank, and d point: inside a treatment water passage 25 for use in returning the treated water from the treatment water tank 20 to the aquaculture tank 2, and measurements may be carried out on any one of these points or a plurality of these points. FIG. 1 shows a state in which the ammonia sensor 12 is installed at the a point.

Moreover, an ORP (oxidation-reduction potential) measuring device 22 may be installed at the measuring position of the above-mentioned ammonia sensor 12 in the same manner as in this ammonia sensor 12. In this case, the ORP of the cultivation water treated in the decomposition treatment means 11 can be measured by the ORP measuring device 22. FIG. 1 shows a state in which the ORP measuring device 22 is installed at the c point.

Although not shown in the FIGS., an activated carbon tower may be installed in the middle of a water passage for use in the ozone treatment or in the middle of the return water passage 25 for returning cultivation water to be treated to the aquaculture tank 2, and harmful oxidative substances, such as chloric acids or the like, generated by the ozone treatment may be removed by the activated carbon tower. In this case, as the activated carbon tower, for example, not only the activated carbon, but also zeolite, silica, coral sand or the like, which can remove oxidative substances, may be utilized. Inside the water passage, an ultraviolet-ray lamp for sterilizing and decomposing treatments, a filtration filter for use in removing residues, excreta, etc., or the like may be installed. Alternatively, aqueous hydrogen peroxide may be added to the water passage; thus, by carrying out the treatment while adding the aqueous hydrogen peroxide, the ammonia decomposition rate can be improved.

Moreover, the apparatus main body 1 may be operated, while controlling seawater components, such as ozone, ammonia, bromic ions and chlorine ions, so as to be set to appropriate rates by the treatment section 3.

The following description will explain a circulation type aquaculture method using the above-mentioned circulation type aquaculture apparatus.

In the circulation type aquaculture method of the present invention, an ammonia decomposition rate is set in accordance with an individual apparatus main body 1, and by using this apparatus main body 1, cultivation water of the circulation type aquaculture tank 2 in which aquatic organisms are kept is ozone-treated, and in this case, for example, treatments from a first step to a fourth step are carried out, for example, by batch (batch-wise) treatments so that ammonia in the cultivation water is decomposed and treated by these steps.

In the first step in the circulation type aquaculture method, an ammonia decomposition rate to be used for treating the cultivation water of the aquaculture tank 2 is preliminarily found, and a target ammonia remaining amount after the decomposition treatment is also set.

In the second step, the ammonia amount in cultivation water to be treated is found, and a treatment period of time required for reducing the ammonia amount to the target ammonia remaining amount of the first step is calculated from the ammonia decomposition rate of the first step.

In the third step, the ammonia in the cultivation water is decomposed and treated by ozone or hypochloric acid in the treatment period of time calculated in the second step.

In the fourth step, the cultivation water that has been subjected to the decomposition treatment in the third step is returned to the aquaculture tank 2.

In this case, the ammonia decomposition rate is found relative to the apparatus main body 1 having a predetermined structure, and by using the ammonia decomposition rate, ammonia is decomposed and treated by the apparatus main body 1 in the steps of the second step and thereafter. Here, the apparatus main body 1 having the predetermined structure refers to an apparatus having a function capable of decomposing ammonia at the same efficiency as that of the apparatus main body 1 to be used in the second step and thereafter, which corresponds to an aquaculture apparatus provided with a decomposition treatment means 11 (organizer 13) and an activated carbon tower capable of exerting the identical functions. For example, as the apparatus main body 1 having the predetermined structure, the apparatus main body 1 itself to be used in the second step and thereafter, or an apparatus different from the apparatus main body 1 to be used in the second step and thereafter although it has the same structure may be used.

In the circulation type aquaculture method, at the time of decomposition treatment including steps from the second step to the fourth step of the second time and thereafter, a value obtained by feeding back the results of the previous treatment is desirably used as the ammonia decomposition rate.

Moreover, the ORP of the cultivation water after decomposition treatments up to the second step and the third step is measured, and at the time when the measured value has reached a predetermined set value, the decomposition treatment may be stopped.

In the case when cultivation water is ozone-treated by the above-mentioned aquaculture method, the pH of the treated water is fluctuated although its amount is small; therefore, a chemical liquid may be charged into the aquaculture tank 2, the treatment water tank 20 and the treatment water passage 24 as well as into the return water passage 25, so as to adjust the pH. Moreover, in the ozone treatment, the decomposing rate of ammonia is improved on the alkali side. This is caused by the existence ratio of $NH_3/NH_4^+$; however, since the pH that allows fishes/shellfishes to grow is limited to a range from 6 to 9, the pH of the cultivation water needs to be set in this range. By shifting the pH of the treated water slightly close to the alkali side by the development of the chemical liquid, it becomes possible to efficiently decompose ammonia.

Furthermore, for example, at the time of a pH of 8.2 in the aquaculture tank 2, the pH of the return water may be set to 8.1; thus, by setting the pH adjustment value of the return water slightly lower than that of the aquaculture tank 2, even if the pH in the aquaculture tank 2 is raised due to any reason, it is not necessary to carry out adjustments in the aquaculture tank 2. With this arrangement, even in the case when the pH of the aquaculture tank 2 is lowered, since the pH of the return water is raised to about 8.1, it is possible to prevent the pH of the aquaculture tank 2 from being lowered to such a level as not to be suitable for the growth environment of fishes/shellfishes.

Upon returning the ozone-treated water to the aquaculture tank 2, for example, one pipe is bridged over the upper portions of the aquaculture tank 2, with a plurality of discharging outlets being formed on this pipe (not shown); thus, for example, by discharging the treated cultivation water from these discharging outlets into the aquaculture tank 2, the treated water is desirably returned to the aquaculture tank 2, while being dispersed. This arrangement is made because in the case when the treated water is discharged from only one discharging outlet, water having a quality different from that of the cultivation water is allowed to flow into the aquaculture tank 2, although it might be a partial portion, to cause the risk of giving stress to fishes/shellfishes existing at that place.

Next, the following description will more specifically discuss operations and functions of the aquaculture method by using the above-mentioned apparatus main body.

First, the following description will explain a culturing process that is carried out by batch treatments in the apparatus main body 1 shown in FIG. 1 by the use of the circulation type aquaculture method of the present invention.

Prior to actually carrying out an ozone-treatment on cultivation water, the ammonia decomposition rate v [g/min] of the apparatus main body 1 is preliminarily found by using sample water. In this case, the ammonia decomposition rate may be found by decomposing ammonia actually contained in the cultivation water; however, the process becomes simpler when seawater formed by artificially adding chemicals, such as ammonium chloride and the like, thereto is utilized. In this case, sample waters are prepared by changing conditions, such as kinds, temperatures, pH, ozone concentration or the like of the seawater, and the sample waters are desirably subjected to decomposing tests by using the apparatus main body 1.

At this time, in addition to finding out the ammonia decomposition rate, an attempt is made to find out an ammonia decomposition concentration slightly before the start of the generation of bromic acid. This is because upon carrying out an ozone treatment on seawater, normally, at first, ammonia is decomposed without the generation of bromic acid to cause the concentration to be decreased, but as the concentration of ammonia comes close to zero, bromic acid is generated. In this case, in the apparatus main body 1 installed in an individual structure, the ammonia decomposition rate is in particular greatly influenced by the injection amount, the concentration and the like of ozone applied by the ozonizer 13.

Upon determining the ammonia concentration, after finding out the ammonia decomposition concentration slightly before the generation of bromic acid in the apparatus main body 1, an ammonia concentration to be remained is determined by taking safety into consideration. This value is defined as a target ammonia concentration Cstop[g/L], and set to be a control value to be processed by the control means 10. The ammonia decomposition concentration at which the generation of bromic acid is started may be found out by carrying out the ammonia decomposition until bromic acid has been actually generated, or may be found out by carrying out a prediction based upon behaviors of the ammonia decomposition.

The following description will discuss respective sequences of treatments in the case when the ammonia concentration is measured at the respective measuring points from a point to d point of the ammonia sensor 12 in the apparatus main body 1 of FIG. 1.

(1) In the Case of Setting the Ammonia Sensor at the Inside of an Aquaculture Tank (a Point)

In the case of installing the ammonia sensor 12 at a point, the ammonia concentration $C_0$ [g/L] inside the aquaculture tank 2 is measured. In the case when this ammonia concentration exceeds a value Cstart [g/L] (ammonia concentration at which the ozone treatment is started) that is considered to be influential to the growth and the life/death of fishes/shellfishes, by making the judgment that the ammonia concentration is excessive, a determination is made so as to carry out the ozone treatment.

At the time of measurements, first, one portion of the cultivation water inside the aquaculture tank 2 is shifted to the treatment water tank 20, and suppose that the ammonia concentration in the treatment water tank 20 is the same as the ammonia concentration in the aquaculture tank 2. Then, supposing that the treatment water amount in the treatment water tank 20 is V[L], an ozone treatment time t[min] required for lowering ammonia to the target ammonia concentration Cstop [g/L] by operating the ozone treatment by time t[min] is represented by: $t=V\times(C_0-Cstop)/v$ (expression 1), the ozone treatment is carried out for this treatment time t. The treated water after the ozone treatment is returned into the aquaculture tank 2, and in the case when, after the returning process, the concentration inside the aquaculture tank 2 has not reached Cstop [g/L], the corresponding treatment is repeated. Thus, it becomes possible to maintain the ammonia concentration inside the aquaculture tank 2 in a habitation environment for fishes/shellfishes.

(2) In the Case of Setting the Ammonia Sensor at the Inside of a Treatment Water Tank (b Point)

In this case, when an ammonia sensor 12 having a good time responsiveness, such as a continuous ammonia measuring device, is used for measuring ammonia, one portion of cultivation water inside the aquaculture tank 2 may be regularly drawn into the treatment water tank 20 so that the ammonia concentration can be measured.

Upon measurements, in the case when the ammonia concentration has not reached the ozone treatment starting concentration Cstart [g/L], the corresponding water is returned to the aquaculture tank 2, and the sequence enters awaiting state until the ammonia concentration has increased. In this case, by preliminarily finding out the ammonia rising rate inside the aquaculture tank 2, the waiting time, that is, a timing at which the cultivation water is drawn next time, can be calculated.

In the case when the ammonia concentration inside the treatment water tank 20 has reached the ozone treatment starting concentration Cstart [g/L], by making the judgment that the ozone treatment is required, the ozone treatment is started. At this time, while measuring the concentration by the ammonia sensor 12, the ozone treatment is carried out until the target ammonia concentration Cstop [g/L] has been reached. After the ozone treatment, the treated water is returned to the aquaculture tank 2, and by repeating these processes, the ozone treatment is continuously carried out.

In this case, since an ammonia reduction amount per one time batch treatment can be calculated, the number of the batch treatments required for reducing the ammonia concentration inside the aquaculture tank 2 to the target ammonia concentration Cstop [g/L] can be approximately calculated. Additionally, even in the case when the ammonia sensor 12 having a good time responsiveness is used, the treatment time is preliminarily calculated from the ammonia decomposition rate preliminarily found out about the apparatus main body 1 to be used, and the calculation result may also be used as a judgement factor based on which the termination time of the ozone treatment is determined.

On the other hand, in the case when long time is required for measuring the ammonia concentration, such as batch measurements or the like, as well as in the case when the responsiveness of the ammonia sensor 12 is poor, it becomes difficult to apply the above-mentioned treatment method. In order to solve this problem, in the same manner as in the case of installing the ammonia sensor 12 at the above-mentioned a point, the ozone treatment time is calculated so that the ozone treatment may be carried out during the corresponding period of time. Thus, by repeating the job for returning the treated water that has been treated to the aquaculture tank 2 until the target ammonia concentration Cstop [g/L] has been reached, the ammonia concentration can be maintained in a predetermined state.

(3) In the Case of Setting the Ammonia Sensor at the Inside of an Ozone Treatment Water Passage (c Point)

In the case when the ammonia sensor 12 is installed at the c point, an ozone treatment can be carried out in the same manner as in the case of the installation at the b point. In this case, cultivation water is once drawn into the aquaculture tank 2, and allowed to flow through the ozone treatment water passage without using ozone, and the resulting water can be defined to have an ammonia initial concentration $C_0$ [g/L] in the treatment water tank. With respect to treatments for confirming the property of the responsiveness of the ammonia sensor 12 as well as treatments in which the worker directly carries out the concentration measurement, the same treatments as those carried out as described above may be executed.

(4) In the Case of Setting the Ammonia Sensor at the Inside of a Return Water Passage (d Point)

In the same manner as described above, cultivation water is once drawn into the aquaculture tank 2, and the ammonia concentration $C_0$ [g/L] of the cultivation water is measured, while the cultivation water is being circulated in a manner so as to be returned through the water passage, and the judgement may be made as to whether or not the ozone treatment is required based upon the results of the measurements. In this case, in the same manner as in the aforementioned case, a process for calculating the ozone treatment time is carried out.

In any of these cases in which the ammonia sensor 12 is installed at any one of these measuring points so as to carry out the ozone treatment, after the completion of the ozone treatment, the ammonia concentration inside the treatment water tank 20 is measured so that the actual ammonia treatment rate is calculated, and a controlling process for using this value individually, or a controlling process for accumulating results of a plurality of times in a data storage section 14 so as to be averaged, or a controlling process for storing variations day by day, and variations are predicted from data in the corresponding time zone up to the previous day and compared, is carried out so as to be effectively used as the ammonia decomposition rate v [g/min] for use in calculating the treatment time of the next time and thereafter.

In the case when the above-mentioned ozone treatment is carried out, as ammonia is excessively decomposed to cause the generation of bromic acid, the oxidation-reduction potential of the treated water is abruptly increased. For this reason, in order to prevent problems, such as excessive charging of ozone to lead to the generation of bromic acid, or the like, by measuring the oxidation-reduction potential of the treated water by the ORP measuring device 22 and by taking such a step as to stop the apparatus main body 1 or the like in accordance with the results of measurement, the generation of bromic acid can be positively prevented. In this case, it is desirable to measure the oxidation-reduction potential immediately after the ozone treatment, and by measuring at this measuring point, the abrupt reduction of ammonia can be confirmed and variations in the oxidation-reduction potential can be detected with the highest sensitivity. The expression "immediately after the ozone treatment" refers to a state after the ozone treatment until the flow passage for the ozone-treated cultivation water has been joined to another flow passage, or to a state before another component has been added to the ozone-treated cultivation water, which corresponds to, for example, the aforementioned c point. Additionally, since the remarkable phenomenon of ammonia can be detected not necessarily immediately after the ozone treatment, the ORP measuring device 22 may be installed, for example, at a portion other than the aforementioned c point.

Moreover, in the same manner as in the case of measuring the oxidation-reduction potential immediately after the ozone treatment, by measuring the ammonia amount in water immediately after the ozone treatment in real time, the ozone injection amount can be actively controlled based upon the results of measurements so that it becomes possible to more positively prevent the generation of bromic acid.

In the circulation type aquaculture method of the present invention, by carrying out the above-mentioned treatment, harmful ammonia contained in cultivation water for fishes/shellfishes can be decomposed and removed by using ozone without causing the generation of oxidants and bromic acid so that it becomes possible to realize a water quality environment suitable for existence of fishes/shellfishes upon rearing them. Moreover, the method is applicable not only to the ammonia decomposition by ozone, but also to the decomposition by hypochloric acid generated by electrolysis of seawater, or the like.

In this case, although the concentration of ammonia generated in water is constantly varied due to a rearing process of fishes/shellfishes, by carrying out the decomposing treatment so as not to make the concentration zero, but to make the concentration close to a constant value, ammonia can be decomposed and removed, while avoiding the generation of bromic acid. Thus, it becomes possible to avoid the generation of bromic acid in the case of an excessive injection amount of ozone and the accumulation of ammonia in the case of an excessively small injection amount thereof.

Furthermore, since the possibility of generation of bromic acid might be raised due to differences in the structure and shape of the aquaculture apparatus as well as differences in the treatment water quality due to the pipes, pH, temperature and dissolved substances, by preliminarily confirming the ammonia decomposition rate and the residual ammonia concentration or the like that causes no generation of bromic acid, under various conditions, it becomes possible to reduce ammonia to a constant concentration, while positively preventing the generation of bromic acid.

At the time of measuring ammonia, the time responsiveness can be improved by using an ammonia sensor 12 such as a continuous ammonia measuring device or the like, and on the other hand, in the case when long time is required for measuring the ammonia concentration, such as batch measurements or the like, as well as in the case when the responsiveness of the ammonia sensor 12 is poor, by calculating the ozone treatment time from the ammonia decomposition rate and the ammonia concentration after the treatment preliminarily obtained for each of the apparatus main bodies 1 and by controlling the ozonizer 13 based upon the results of calculations, it becomes possible to prevent an excessive ozone treatment and consequently to positively suppress the generation of bromic acid.

Moreover, by accumulating data of the calculated ammonia decomposition rate in the data storage section 14 and by analyzing the data, more accurate calculation processes can be achieved by reflecting the resulting data to the decomposition rate to be used in the next time and thereafter, even when the water quality of the treated water is more or less instable.

Furthermore, by measuring variations in the oxidation-reduction potential immediately after the ozone treatment in combination with the ORP measuring device 22, even when bromic acid is erroneously generated due to a failure or the like of the apparatus main body 1 to cause water containing bromic acid, an effective bromic acid preventive countermeasure can be taken by positively stopping its water sending process.

The following description will discuss a second embodiment of the circulation type aquaculture method of the present invention. Additionally, in the following description, the same components as those of the aforementioned embodiment are indicated by the same reference numerals, and the description thereof will be omitted.

Figure 2:
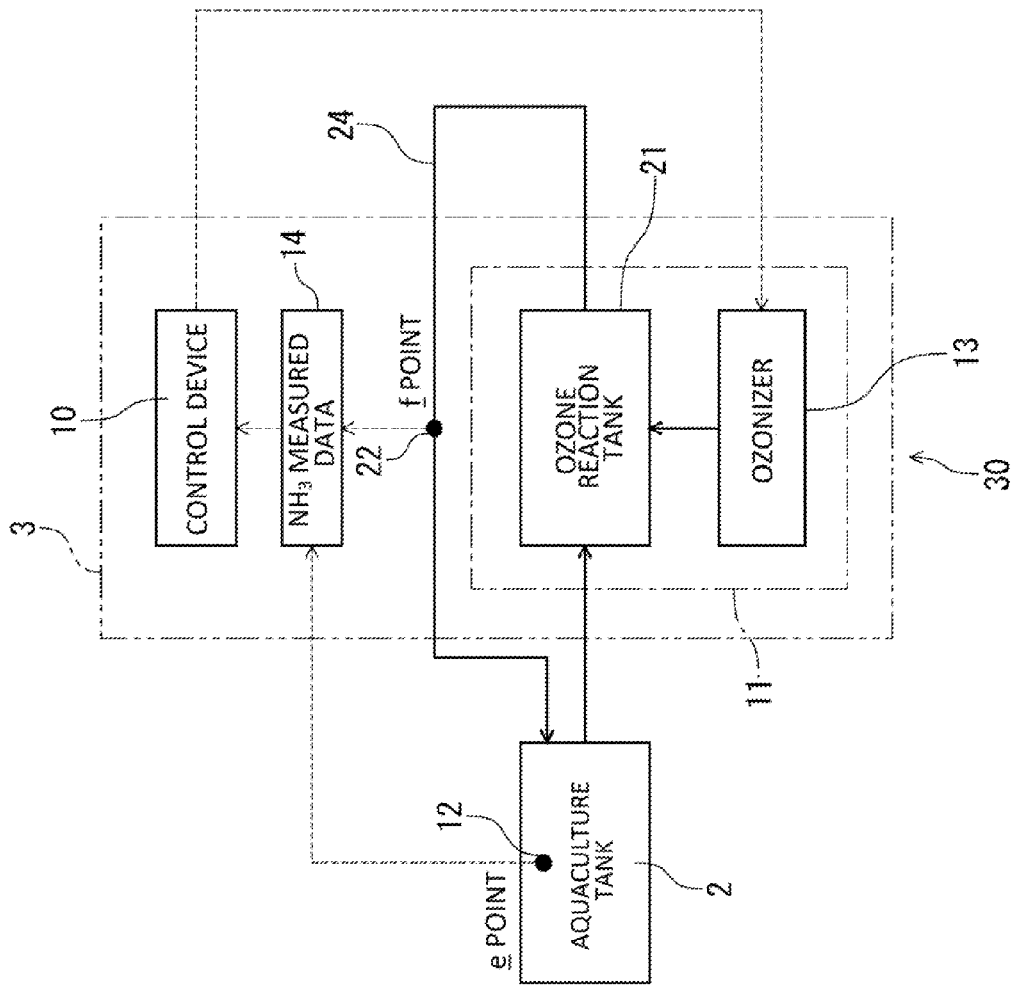
FIG. 2 is a schematic view showing a second embodiment of the circulation type aquaculture apparatus.

FIG. 2 shows another example of the apparatus main body, and in this apparatus main body 30, an ozone treatment is carried out by using a one-pass treatment (single-pass process). The structure of the apparatus main body 30 in the case of carrying out the one-pass treatment is similar to that of the batch type; however, in this case, no treatment water tank as shown in FIG. 1 is required, and the cultivation water that has been ozone-treated is directly returned from the aquaculture tank 2 again to the aquaculture tank 2.

In the case when the ammonia concentration is measured by the apparatus main body 30 of FIG. 2, either one of two points or both of the two points, that is, e point: inside the aquaculture tank 2, and f point: inside the ozone treatment water passage 24, form measuring points. FIG. 2 shows a state in which the ammonia sensor 12 is installed at the e point, with the ORP measuring device 22 being installed at the f point.

(1) In the Case of Installing the Ammonia Sensor at the Inside of the Aquaculture Tank (e Point)

In this case, in the case where the ammonia sensor 12 having a good time responsiveness, such as a continuous ammonia measuring device, is used for measurements, when a preliminarily set Cstart [g/L] has been exceeded, an ozone treatment is carried out while measuring the ammonia concentration $C_0$ [g/L] of the aquaculture tank 2, and when the ammonia concentration has reached a target concentration Cstop [g/min], the ozone treatment is stopped; thus, by measuring the ammonia concentration after a predetermined waiting period of time, or regularly, the ozone treatment is carried out.

On the other hand, in the case where long time is required for measuring the ammonia concentration, such as batch measurements or the like, as well as in the case where the responsiveness of the ammonia sensor 12 is poor, the ammonia concentration at the e point inside the aquaculture tank 2 is measured, and when the measured value has exceeded a preliminarily set Cstart [g/L], the ozone treatment time t[min] is calculated from the ammonia decomposition rate v [g/L], and the ozone treatment is carried out based upon the calculated time.

(2) In the Case of Installing the Ammonia Sensor at the Inside of the Ozone Treatment Water Passage (f Point)

In the same manner as in the above-mentioned case, while rearing water is circulated through the ozone treatment water passage 24 without generating ozone, the ammonia concentration $C_0$ [g/L] of the aquaculture tank 2 is measured so that the ozone treatment is carried out until the value of the ammonia sensor 12 has reached a target concentration Cstop [g/min]. The ozone treatment time t [min] at this time is calculated, and the treatment is carried out based upon the calculated time.

EXAMPLES

Figure 3:
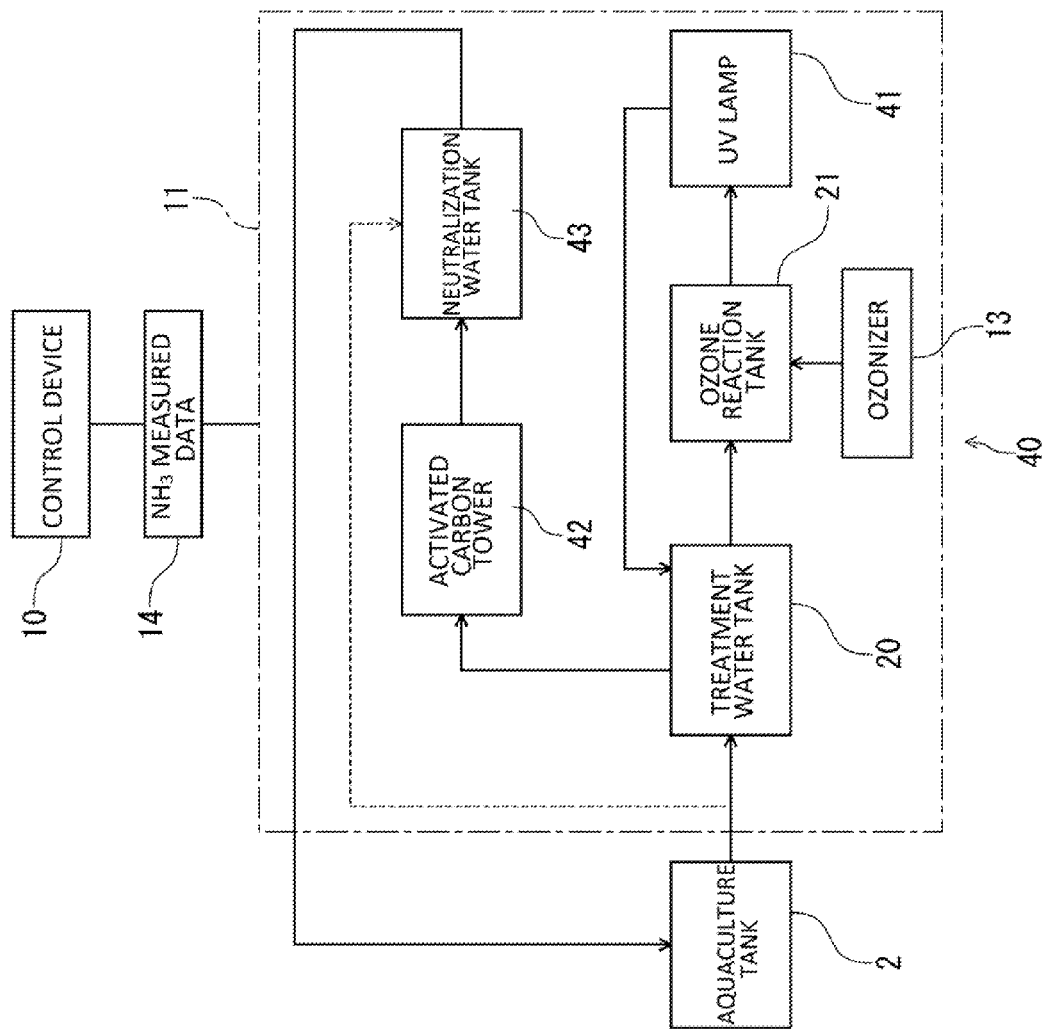
FIG. 3 is a schematic view showing one example of a treatment flow in accordance with a circulation type aquaculture method of the present invention.

Next, by using a circulation type aquaculture apparatus (apparatus main body 40) shown in FIG. 3, fishes were actually reared, and the controlling process of ammonia amount discharged from the fishes was examined.

In the examination, an aquaculture tank 2 (inner volume: 2000 L), a treatment water tank 20 (inner volume: 500 L), an ozone reaction tank 21, an ozone generator and an oxygen supplying device (ozonizer) 13, an ultraviolet-ray irradiation UV lamp 41, an activated carbon tower 42 and a neutralization water tank 43 (inner volume: 500 L) were used in combination so as to carry out treatments. As purposes obtained by using these devices, the activated carbon tower 42 was used for removing oxidative substances generated by the ozone treatment, and the oxidation-reduction potential of treated water after passing through the activated carbon tower 42 was greatly reduced in comparison with that before the passage, with the result that a difference from the oxidation-reduction potential of the rearing water became smaller. The neutralization water tank 43 was used for dropping chemicals, such as NaOH and HCl as well as ascorbic acid or the like into water to be treated, and for mixing one portion of the rearing water of the aquaculture tank 2 therewith, so as to adjust the pH and oxidation-reduction potential changed by the ozone treatment to be made closer to the water quality of the aquaculture tank 2, prior to returning the treated water to the aquaculture tank 2. By these treatments, influences of the treated water given to fishes/shellfishes in the aquaculture tank 2 are minimized.

Upon performing treatment on the cultivation water by the apparatus main body 40, first, ammonium chloride was added to artificial seawater, and the ammonia decomposition rate and the ammonia decomposition concentration slightly before the start of the generation of bromic acid of the apparatus main body 40 were found. At this time, the pH of the artificial seawater was 8.2, the ammonia decomposition rate v obtained by tests in several times was about 17.7[mg/L] and the ammonia decomposition concentration was about 1[mg/L]. Therefore, by multiplying this value by 1.5 as a margin rate, the target ammonia concentration Cstop was set to 1.5[mg/L], and by using this value, the apparatus was operated to carry out a rearing test. The margin rate may be set to a value as safe as possible, which causes no generation of bromic acid, and for example, may be set to 1 to 2 times the ammonia residual concentration that has been preliminarily found.

Next, artificial seawater of 1800 L was loaded into the aquaculture tank 2, and into the aquaculture tank 2, 20 flatfishes (350 g×20=7 kg in total) were put as aquatic organism for use as common test samples, and raised for a rearing period of two weeks (14 days). During the rearing period, air was diffused inside the aquaculture tank 2 by using an air pump, and the water temperature was controlled by using an air conditioner to a constant state of 20° C. Upon feeding the flatfishes, solid feed (EP) was used, and the solid feed was given at an amount of 0.5% of the total fish weight per day.

The ozone treatment time was set to the daytime from 9:00 to 17:00, under conditions of 6 batches/day, 10 to 20 minutes/batch and water amount of 300 L per batch. No feed was given during night time from 17:00 to 9:00, with only the air diffusing process being carried out. The flatfishes were raised while operating the aquaculture apparatus under these conditions, and the survival rate and growth of the flatfishes as well as the change in ammonia amount two weeks later were found.

Table 1 shows measured values for the respective numbers of batches after the batch treatment. In the Table, the respective results of measurements are shown as follows: A: ammonia concentration [mg/L] before the treatment in the treatment tank, B: ozone treatment time [sec] found based upon the target ammonia concentration 1.5 [mg/L] and the preliminarily found ammonia treatment rate, C: ammonia concentration [mg/L] after the treatment in the treatment tank, and D: ammonia decomposition rate [mg/min] calculated from the change in the ammonia concentration of the corresponding batch.

In this case, the ozone treatment time [sec] of B is a value calculated from the aforementioned expression (expression 1: ozone treatment time t [min]=V×($C_0$−Cstop)/v), which is an input value to the control device 10. The ammonia decomposition rate [mg/min] of D is a function depending on A: ammonia concentration [mg/L] before the treatment in the treatment tank. In this case, the function is represented by a constant or a polynomial, and the ammonia reduction amount per unit time obtained by the preliminary measurements, as it is, may be applied to this, or a function depending not only on apparatus functions, such as the structure of the apparatus main body 1 and ozone treatment conditions, but also on rearing conditions, such as the feeding amount of the rearing fishes/shellfishes, total weight of the fishes, the appropriate feeding amount and dark/light periods of time, etc., may be used. Among these, some of the values may be quoted from documents or the like. In this Table, the ammonia decomposition rate of the first batch of D was obtained by using the latest available data (previous day), and in the second batch and thereafter, the actual decomposition rate obtained from the previous batch was calculated, and used for the calculation of the ozone treatment time of the next time.

TABLE 1

| Number of batches | A (Actual measured value) Ammonia concentration [mg/L] before treatment in treanment water tank | B (Calculated value = Input value) Ozone treatment time [sec] | C (Actual measured value) Ammonia concentration [mg/L] after treatment in treatment water tank | D (Actual measured value) Ammonia decomposition rate [mg/min] |
|---|---|---|---|---|
| 1 | 2.66 | 1162 | 1.54 | 17.66 |

TABLE 1-continued

| Number of batches | A (Actual measured value) Ammonia concentration [mg/L] before treatment in treanment water tank | B (Calculated value = Input value) Ozone treatment time [sec] | C (Actual measured value) Ammonia concentration [mg/L] after treatment in treatment water tank | D (Actual measured value) Ammonia decomposition rate [mg/min] |
|---|---|---|---|---|
| 2 | 2.55 | 1066 | 1.58 | 17.73 |
| 3 | 2.43 | 947 | 1.58 | 17.80 |
| 4 | 2.34 | 847 | 1.57 | 17.86 |
| 5 | 2.26 | 763 | 1.57 | 17.91 |
| 6 | 2.22 | 727 | 1.61 | 17.93 |

As the results of Table 1, in the case when cultivation water having an ammonia concentration of 2.22 to 2.66 [mg/L] was drawn into the treatment water tank 20, the ammonia concentration after the ozone treatment was lowered to 1.54 to 1.61 [mg/L]. Moreover, by carrying out the treatment in a manner so as not to fall below the ammonia concentration of 1.5 [mg/L] corresponding to the target value, it was possible to positively suppress the generation of bromic acid.

FIG. 4 shows the ammonia concentrations of the aquaculture tank on stages of 9:00 and 17:00 on the measuring day. In each of the days, it was confirmed that since no ozone treatment was carried out at night time (17:00 to 9:00), ammonia was accumulated with the result that the measured value on the next day at 9:00 was raised, while since the ozone treatment was carried out in the daytime (9:00 to 17:00) on the day, the ammonia was reduced so that the measured value was lowered on the stage of 17:00 on the corresponding day.

Two weeks later, the ammonia concentration became 2.5[mg/L] so that by the ozone treatment over the two weeks, the ammonia amount was controlled substantially at a constant amount of about 2 to 2.5[mg/L]. In this embodiment, the treatment was carried out, with the target ammonia concentration in the treatment water tank 20 being set to 1.5 [mg/L], and the ammonia concentration close to the target value was obtained for each of the batches. However, since only six batches per day were carried out, the ammonia concentration in the aquaculture tank 2 became a value higher than the target value for each batch. By increasing the number of batches, the ammonia concentration of the aquaculture tank 2 can also be made closer to the target ammonia concentration for each batch.

Even after a lapse of two weeks, with respect to the flatfishes that were aquatic organisms that had been reared, all the 20 flatfishes were survived (survival rate: 100%). Table 2 shows the growth property and feeding efficiency of the aquatic organisms. In the Table, "number" represents the number of individuals that were measured, and "efficiency" represents the growing efficiency.

TABLE 2

| Section | Number | Overall Length (mm) | | | Body length (mm) | | | Wet weight (mm) | | | Efficiency (%) |
|---|---|---|---|---|---|---|---|---|---|---|---|
| | | Maximum | Minimum | Average | Maximum | Minimum | Average | Maximum | Minimum | Average | |
| Start time | 20 | 335 | 297 | 311 | 282 | 242 | 260 | 399.8 | 311.1 | 358.3 | — |
| Finish time | 20 | 343 | 305 | 322 | 292 | 252 | 269 | 440.7 | 330.3 | 391.4 | 96.98 |

As the results of Table 2, because of not only the fact that by the cultivation of two weeks, the overall length was increased by 3.5%, the body length was increased by 3.5% and the wet weight was increased by 9.2%, but also the fact that the feeding efficiency was 96.98%, it was found that the flatfishes substantially ate feed without leftovers.

Based upon these, it has been clarified that by carrying out a cultivation process by using the aquaculture method of the present invention, fishes/shellfishes can be reared and grown without causing any problems; thus, effectiveness of the aquaculture method and aquaculture apparatus has been demonstrated.

EXPLANATION OF REFERENCE NUMERALS

1, 30 apparatus main body
2 aquaculture tank
3 treatment section
10 control device (control means)
11 decomposition treatment means
22 ORP measuring device

What is claimed is:
1. A circulation type aquaculture method, which is a method for treating cultivation water in a circulation type aquaculture tank in which aquatic organisms are kept by an aquaculture apparatus main body, comprising:
   a first step of finding an ammonia decomposition rate upon preliminarily treating the cultivation water by using ozone or hypochloric acid, while setting a target remaining amount of ammonia after the decomposing treatment;
   a second step of finding the amount of ammonia in cultivation water to be treated so as to calculate a treating period of time required for reducing from the corresponding ammonia amount to the target remaining amount of ammonia of the first step based upon the ammonia decomposition rate of the first step;
a third step of treating the cultivation water by using ozone or hypochloric acid during the treating period of time calculated in the second step so as to decompose ammonia in the cultivation water; and
a fourth step of returning the cultivation water that has been subjected to the decomposing treatment in the third step to the aquaculture tank.

2. The circulation type aquaculture method according to claim 1, wherein the ammonia decomposition rate is found relative to the apparatus main body having a predetermined structure, and by using the ammonia decomposition rate, ammonia is treated and decomposed by the apparatus main body in the second step and the steps thereafter.

3. The circulation type aquaculture method according to claim 1, wherein at the time of decomposition treatment including steps from the second step to the fourth step of the second time and thereafter, a value obtained by feeding back the results of the previous treatment is used as the ammonia decomposition rate.

4. The circulation type aquaculture method according to claim 1, wherein an ORP value of the cultivation water after the decomposition treatment from the second step to the third step is measured, and when the measured value has reached a set value preliminarily determined, the decomposition treatment is stopped.

5. A circulation type aquaculture apparatus comprising:
a circulation type aquaculture tank for rearing aquatic organisms; and
a treating section which treats cultivation water drawn from the aquaculture tank by using ozone or hydrochloric acid, and then returns the treated cultivation water to the aquaculture tank,
wherein the treating section comprises a control means that sets a decomposition rate of ammonia and a target remaining amount of ammonia after the decomposing treatment, and calculates a treating period of time required for reducing the ammonia amount in the cultivation water to be treated to the target remaining amount of ammonia, and a decomposition treatment means for treating the cultivation water by using ozone or hypochloric acid so as to decompose ammonia in the cultivation water.

6. The circulation type aquaculture apparatus according to claim 5, further comprising:
an ORP measuring device for measuring an ORP of the cultivation water treated by the decomposition treatment means.

7. The circulation type aquaculture method according to claim 2, wherein at the time of decomposition treatment including steps from the second step to the fourth step of the second time and thereafter, a value obtained by feeding back the results of the previous treatment is used as the ammonia decomposition rate.

8. The circulation type aquaculture method according to claim 2, wherein an ORP value of the cultivation water after the decomposition treatment from the second step to the third step is measured, and when the measured value has reached a set value preliminarily determined, the decomposition treatment is stopped.

9. The circulation type aquaculture method according to claim 3, wherein an ORP value of the cultivation water after the decomposition treatment from the second step to the third step is measured, and when the measured value has reached a set value preliminarily determined, the decomposition treatment is stopped.

* * * * *